United States Patent
Esaka et al.

[11] Patent Number: 5,841,097
[45] Date of Patent: Nov. 24, 1998

[54] PROCESS AND APPARATUS FOR WELDING WORKPIECES WITH TWO OR MORE LASER BEAMS WHOSE SPOTS ARE OSCILLATED ACROSS WELDING DIRECTION

[75] Inventors: Fumikatsu Esaka; Toshiyuki Takasago; Eiji Nishi, all of Toyota, Japan

[73] Assignee: Toyota Jidosha Kabushiki Kaisha, Japan

[21] Appl. No.: 771,655

[22] Filed: Dec. 23, 1996

[30] Foreign Application Priority Data

Dec. 27, 1995 [JP] Japan .................................... 7-340457

[51] Int. Cl.⁶ .................................................. B23K 26/06
[52] U.S. Cl. .............................. 219/121.63; 219/161.64; 219/121.74; 219/121.77
[58] Field of Search ......................... 219/121.63, 121.64, 219/121.73, 121.74, 121.75, 121.76, 121.77, 121.8

[56] References Cited

U.S. PATENT DOCUMENTS

| | | | |
|---|---|---|---|
| 4,572,841 | 2/1986 | Sciaky et al. ....................... | 219/121.64 |
| 4,769,522 | 9/1988 | Lentz et al. ........................ | 219/121.63 |
| 5,138,490 | 8/1992 | Hohberg et al. .................... | 219/121.74 |
| 5,155,323 | 10/1992 | Macken .............................. | 219/121.64 |
| 5,245,156 | 9/1993 | Kamogawa et al. ............... | 219/121.64 |
| 5,303,081 | 4/1994 | Totsuka et al. ..................... | 219/121.74 |
| 5,410,123 | 4/1995 | Rancourt ............................ | 219/121.63 |
| 5,690,845 | 11/1997 | Fuse ................................... | 219/121.74 |

FOREIGN PATENT DOCUMENTS

| | | |
|---|---|---|
| 0 243 293 | 10/1987 | European Pat. Off. . |
| 54-101596 | 8/1979 | Japan ............................... 219/121.64 |
| 57-106489 | 7/1982 | Japan ............................... 219/121.64 |
| 60-240395 | 11/1985 | Japan ............................... 219/121.64 |
| 63-52788 | 3/1988 | Japan ............................... 219/121.64 |
| 1-143784 | 6/1989 | Japan ............................... 219/121.75 |
| 1-228689 | 9/1989 | Japan ............................... 219/121.77 |
| 4-182087 | 6/1992 | Japan ............................... 219/121.76 |
| 5-66281 | 3/1993 | Japan . |

OTHER PUBLICATIONS

Concise Explanation Under Rule 98 (1 page) of JP 5–66281.

Primary Examiner—Gregory L. Mills
Attorney, Agent, or Firm—Finnegan, Henderson, Farabow, Garrett, and Dunner, L.L.P.

[57] ABSTRACT

Laser welding process and apparatus wherein a plurality of laser beams are focussed by a focussing device on surfaces of workpieces such that spots of the laser beams are located in the vicinity of an interface as viewed in a direction perpendicular to a direction of extension of an interface of the workpiece, and the beam spots and the workpieces are fed relative to each other by a feeding device in the direction of extension of the interface, while at the same time the beam spots are oscillated by an oscillating device at a predetermined frequency relative to the workpieces in a direction intersecting the direction of extension of the interface such that the beam spots are moved across the interface.

19 Claims, 7 Drawing Sheets

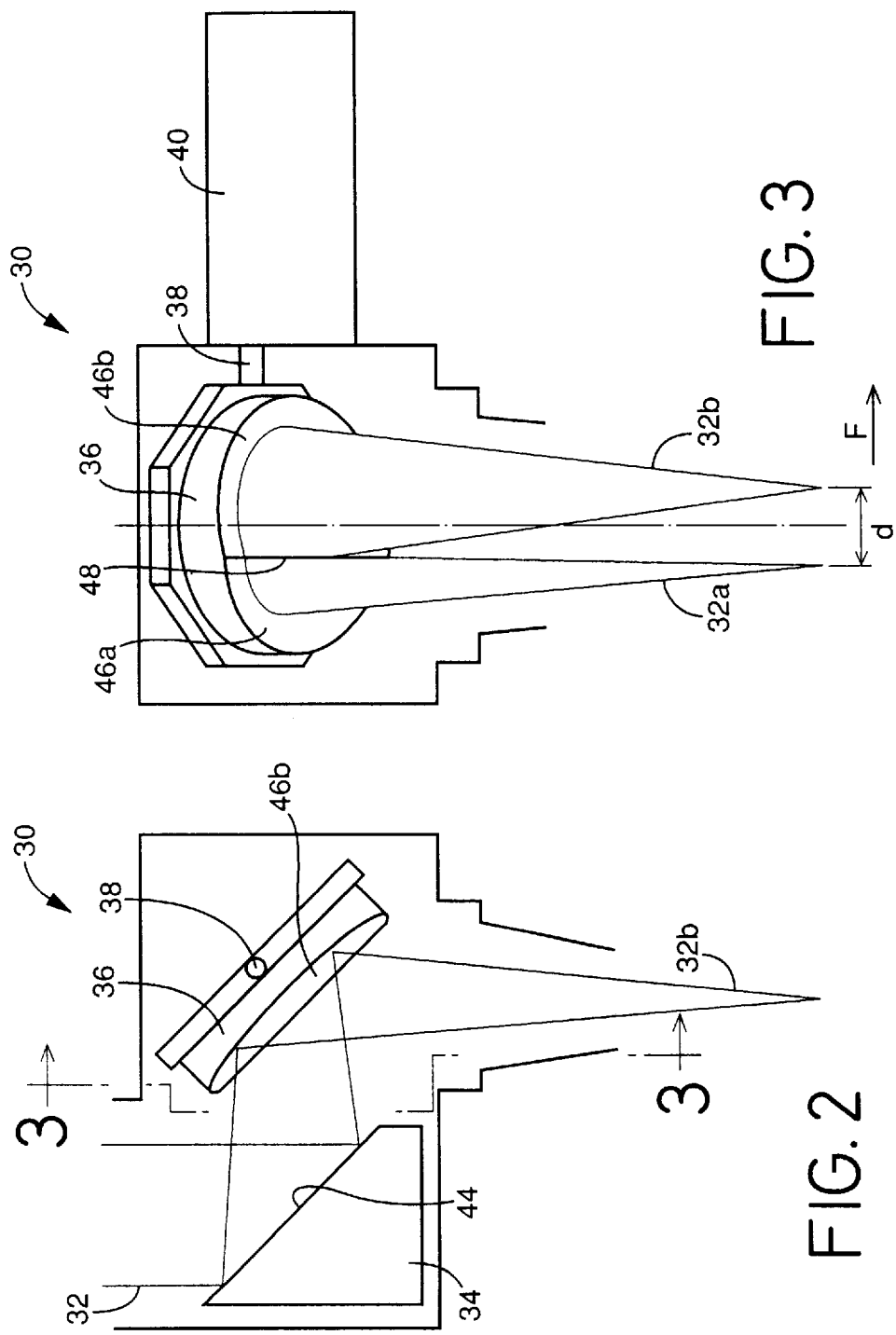

PROCESS AND APPARATUS FOR WELDING WORKPIECES WITH TWO OR MORE LASER BEAMS WHOSE SPOTS ARE OSCILLATED ACROSS WELDING DIRECTION

BACKGROUND OF THE INVENTION

1. Field of the Invention

The present invention relates generally to laser welding process and apparatus, and more particularly to such laser welding process and apparatus using two or more laser beams which are oscillated in a direction intersecting a direction of extension of an interface of workpieces at which a weld seam is formed.

2. Discussion of the Related Art

For welding together workpieces such as steel plates, there is known a laser welding process in which a laser beam is focussed such that a spot of the laser beam is located in the vicinity of an interface of the workpieces at which the workpieces are butted together. The spot of the laser beam is moved relative to the workpieces, along the interface, that is, along the welding line. An example of an apparatus capable of practicing such a known laser welding process is shown in FIG. 9, wherein a laser beam 10 such as carbon dioxide gas laser is generated by a laser source 8, and is incident upon two workpieces in the form of steel plates 14a, 14b, through a torch head 10, such that the laser beam 10 is focussed in the vicinity of an interface 16 of the workpieces as viewed in a direction perpendicular to the direction of extension of the interface 16.

Generally, the spot of the laser beam 10 in such a laser welding process is oscillated at a predetermined frequency relative to the workpieces in a direction intersecting the direction of extension of the interface 16 such that the spot is moved across the interface in opposite directions. To this end, for instance, the torch head 12 incorporates a parabolic mirror 18 having a concave reflecting surface 18a for focussing the laser beam 10 on the surfaces of the steel plates 14a, 14b, and a scanning mirror 22 which is pivotable over a predetermined angular range, about a pivot axis 20 thereof which is parallel to the direction of extension of the interface 16 and the surfaces of the workpieces 14. The laser beam 10 reflected by the parabolic mirror 18 is incident upon the scanning mirror 22, so that the spot of the laser beam 10 on the workpieces 14 is oscillated by oscillatory pivoting movements of the scanning mirror 22.

While the workpieces 14 are irradiated by the laser beam 10 with the spot of the laser beam 10 being moved relative to the workpieces 14 along the interface 16, the scanning mirror 22 is oscillatingly pivoted at a predetermined speed, so that the spot of the laser beam 10 focussed on the surfaces of the workpieces 14 is oscillated across the interface 16 over a predetermined distance "W" in the direction perpendicular to the direction of extension of the interface 16, as shown in FIG. 10. At the same time, the laser beam spot and the workpieces 14 are moved relative to each other in the direction of extension of the interface 16. As a result, the spot of the laser beam 10 takes a movement path 24 in the form of a sinusoidal wave as shown in FIG. 11.

The oscillatory movements of the laser beam spot 10 in the laser welding process using the torch head 12 provide an increase in the width of fusion of the materials of the steel plates 14a, 14b to be welded together. This laser welding process is effective to minimize the formation of a shoulder which would be created at the interface of the two workpieces due to a difference in thickness of the workpieces, as indicated in FIG. 12. Broken line in FIG. 12 indicates the welding condition where the spot of the laser beam 10 is merely moved along the interface 16, without oscillation in the direction perpendicular to the interface 16.

In the known laser welding process in which the spot of the laser beam 10 is moved relative to the steel plates 14 along the interface while the spot is oscillated, the distance between the adjacent peaks of the sinusoidal wave of the movement path of the laser beam spot in the direction of extension of the interface 16 is considerably large. In other words, the laser beam spots are not contiguous with each other or not continuous at positions which are relatively distant from the interface 16 in the direction perpendicular to the direction of extension of the interface 16. Accordingly, the heat generated by irradiation by the laser beam is not evenly distributed or the heating or fusion of the materials of the workpieces is not uniform, in the direction of extension of the interface 16, that is, in the welding direction. To assure a high degree of laser welding reliability, the materials of the two workpieces 14a, 14b should be continuously fused over a sufficiently large width along the interface 16, even on the back side of the workpieces 14 remote from the surfaces upon which the laser beam 10 is incident. That is, the so-called "back bead" should cover a sufficiently large region. To meet this requirement, the distance between the adjacent peaks of the sinusoidal wave of the movement path of the spot of the laser beam 10, namely, the wavelength of the sinusoidal wave, is determined so as to obtain a sufficiently large "back bead" or weld zone on the back side of the workpieces 14. In this respect, it is noted that the materials are least likely to be fused at the positions corresponding to the peaks of the sinusoidal wave of the movement path of the laser beam spot.

The fusion of the materials of the workpieces in a laser welding process takes place primarily by conduction of heat through the materials. The width of the "back bead" is determined or influenced by the thickness of the workpieces 14, the output of the laser beam 10, the period or frequency of oscillation of the laser beam spot (wavelength of the sinusoidal wave of the movement path of the laser beam spot, which determines the distance between the adjacent peaks of the sinusoidal wave in the direction of extension of the interface 16), and the speed of relative movement of the laser beam spot and the workpieces. The width of the "back bead" increases with a decrease in the thickness of the workpieces 14, an increase in the output of the laser beam 10, a decrease of the oscillation period and a decrease of the relative movement speed.

To minimize the welding cost, however, it is desirable not to use the laser beam 10 having a high output and not to oscillate the laser beam 10 with a short period (at a high frequency). For assuring a sufficiently large width of the back bead of the workpieces 14, therefore, the the speed of the relative movement of the spot of the laser beam 10 and the workpieces 14 should be made as low as possible. However, the lower limit of this relative movement speed is determined by the thickness of the workpieces, and the relative movement speed may not be lowered sufficiently in some cases.

SUMMARY OF THE INVENTION

It is therefore a first object of this invention to provide a laser welding process which permits a high speed of relative movement of the laser beam spot and the workpieces, without having to increase the output of the laser beam and the oscillation frequency of the laser beam spot.

It is a second object of this invention to provide a laser welding apparatus suitable for practicing such a laser welding process.

The first object indicated above may be achieved according to a first aspect of this invention, which provides a process of welding together workpieces butted together at an interface, comprising the steps of: (a) focussing a plurality of laser beams on surfaces of the workpieces such that spots of the laser beams are located in the vicinity of the interface as viewed in a direction perpendicular to a direction of extension of the interface; and (b) feeding the spots of the laser beams and the workpieces relative to each other in the direction of extension of the interface, while at the same time oscillating the spots of the laser beams at a predetermined frequency relative to the workpieces in a direction intersecting the direction of extension of the interface such that the spots are moved across the interface.

In the laser welding process of the present invention, the plurality of laser beams are focussed on the surfaces of the workpieces such that the beam spots are located in the vicinity of the interface, and the beam spots are moved relative to the workpieces along the interface while at the same time the spots are oscillated in the direction intersecting to the interface such that the spots are moved across the interface, whereby the workpieces are welded together. Consequently, the present welding process makes it possible to increase the speed of the relative movements of the laser beam spots and the workpieces, that is, the welding speed, without increasing the oscillating frequency of the laser beam spots, even when the total energy of the laser beams is the same as the energy of a single beam used in the known laser welding process.

The above advantage is provided by the use of the plurality of laser beams, as explained below in detail. To begin with, it is considered that the uniformity of heating or fusion of the materials of the workpieces is improved owing to movement paths of the spots of the laser beams in the form of sinusoidal waves which have a relatively short distance between the adjacent peaks in the direction of extension of the interface, whereby the spacing in this direction between the spots moved along the sinusoidal waves is significantly reduced. Secondly, the efficiency of energy absorption in the material in a given portion of the workpieces adjacent to the interface is improved owing to successive irradiations of that portion of the workpieces by the two or more laser beams, whereby the efficiency of heating or fusion of that portion adjacent to the interface is accordingly improved. Consequently, the uniformity of heating or fusion of the materials is increased, leading to a reduced variation in the width of the "back bead" or weld zone or region on the back side of the workpieces. Further, the increased heating efficiency results in a reduced irradiation time required to obtain a sufficiently large width of the back bead. Thus, the present laser welding process permits an increase in the speed of the relative movement of the laser beam spots and the workpieces, without increasing the amount of energy of the laser beams and the oscillating frequency of the beam spots, as compared with the conventional laser welding process in which a single laser beam is used.

Where the movement paths of the two or more laser beams are completely coincident or aligned with each other, the distance between the adjacent peaks of the sinusoidal waves of the movement paths of the beam spots in the direction of extension of the interface is the same as the distance between the adjacent peaks of the sinusoidal wave of the single laser beam used in the prior art. However, each portion of the workpieces irradiated by one of the laser beams is subsequently irradiated by the other laser beam or beams. Namely, the workpieces are irradiated along the interface successively by the two or more laser beams, whereby the heating efficiency of the workpieces is improved. Where the movement paths of the laser beams are offset from each other, for example, where the phase difference of the two laser beams is equal to a half of the wavelength of the sinusoidal waves of the movement paths, or an odd number of times the half wavelength of the sinusoidal waves, the distance between the adjacent peaks of the sinusoidal waves in the direction of extension of the interface can be reduced or minimized (in the case of the above two laser beams), whereby the uniformity of heating of the workpieces is further improved. In this case, a significant improvement in the heating efficiency owing to the successive irradiations by the two or more laser beams is not expected. In either case, the present laser welding process is effective to improve the efficiency of heating or fusion of the workpieces.

In one preferred form of the present laser welding process, the spots and the workpieces are fed relative to each other while the spots are oscillated such that movements paths taken by the spots of the laser beams on the surfaces of the workpieces intersect each other in synchronization of a frequency of oscillation of the spots in the direction intersecting the direction of extension of the interface. In this form of the invention, the movement paths of the laser beams are not coincident or aligned with each other, but intersect each other, whereby the distance between the adjacent peaks of the movement paths in the direction of extension of the interface can be reduced with a result of increased uniformity of heating or fusion in the direction of extension of the interface. In this case, the total amount of energy given by the laser beams at the points of intersection of the movement paths is larger than the amount of energy given at the other points, thereby making it possible to compensate for a comparatively small amount of energy given by each laser beam at the points near the interface at which the distance between the adjacent spots of the laser beams in the direction of the interface is the largest.

In another preferred form of the present process, the laser beams are focussed such that the spots of the laser beams lie on a straight line parallel to the direction of extension of the interface, before the spots are oscillated. In this case, the spots of all the laser beams have the same oscillating range in the direction perpendicular to the interface. The above-indicated straight line represents the center line of the oscillating range. In this case, the oscillating range can be minimized, leading to improved welding efficiency.

In a further preferred form of the present process, the plurality of laser beams consist of a first beam and a second beam which are focussed at respective two spots on the workpieces and which have different amounts of energy. The two spots are spaced from each other in the direction of extension of the interface. In this case, the amounts of energy of the first and second laser beams are determined as needed depending upon the specific welding condition, so that the welding accuracy is improved.

In one advantageous arrangement of the above preferred form of the invention, the second laser beam has a larger amount of energy than the first laser beam, and the first laser beam precedes the second laser beam in a direction of relative movements of the spots of the first and second laser beams and the workpieces in the direction of extension of the interface. In this arrangement, each region of the workpieces along the interface is irradiated first by the first laser beam having the relatively small amount of energy, and then by the second laser beam having the relatively large amount of energy, while the beam spots and the workpieces are moved relative to each other in the direction of the interface. Thus, the first laser beam functions as a preliminary heating beam, while the second laser beam functions as a primary heating beam for heating or fusing the spot pre-heated by the preliminary heating beam, with higher efficiency of absorption of energy in the workpieces upon irradiation by the second laser, whereby a comparatively large weld zone or bead is obtained on the back side of the workpieces remote from the surfaces upon which the laser beams are incident.

In a still further preferred form of the present laser welding process, the spots of the laser beams and the workpieces are fed relative to each other in the direction of extension of the interface while at the same time the spots are oscillated in a direction perpendicular to the direction of extension of the interface. Where the speed of the relative movement of the laser beam spots and the workpieces is held constant, the speed of movement of the laser beam spots on the workpieces in the direction of extension of the interface is also held constant, permitting even distribution of heat in the direction of extension of the interface.

The second object indicated above may be achieved according to a second aspect of this invention, which provides an apparatus for welding together workpieces butted together at an interface, comprising: (i) a focussing device for focusing a plurality of laser beams on surfaces of the workpieces such that spots of the laser beams are spaced from each other in a direction of extension of the interface; (ii) an oscillating device for oscillating the spots of the laser beams at a predetermined frequency relative to the workpieces in a direction intersection the direction of extension of the interface such that the spots are moved across the interface; and (iii) a feeding device for feeding the spots of the laser beams and the workpieces relative to each other in the direction of extension of the interface.

In the present welding apparatus, the focussing device is adapted to focus the laser beams on the surfaces of the workpieces such that the beam spots are located in the vicinity of the interface, and the feeding device and the oscillating device are adapted to move the spots of the laser beams relative to the workpieces along the interface and at the same time oscillate the beam spots in the direction perpendicular to the interface such that the spots are moved across the interface, whereby the workpieces are. welded together. Consequently, the present welding apparatus makes it possible to increase the speed of the relative movements of the spots of the laser beams and the workpieces, that is, the welding speed, without increasing the oscillating frequency of the laser beam spots, even when the total energy of the laser beams is the same as the energy of a single beam in the known apparatus.

In one preferred form of the present welding apparatus, a control device is provided for controlling the oscillating device and the feeding device such that movement paths taken by the spots of the laser beams on the surfaces of the workpieces intersect each other in synchronization with a frequency of oscillation of the spots in the direction intersecting the direction of extension of the interface. In this case, the movement paths of the laser beams are not coincident or aligned with each other, but intersect each other, so that the distance between the adjacent peaks of the movement paths in the direction parallel to the interface is reduced with a result of increased uniformity of heating or fusion in the direction of extension of the interface. In the present case, the total amount of energy given by the laser beams at the points of intersection of the movement paths is larger than the amount of energy given at the other points, thereby making it possible to compensate for a comparatively small amount of energy given by each laser beam at the points near the interface at which the distance between the adjacent spots of the laser beams in the direction of the interface is the largest.

In another preferred form of this laser welding apparatus, the focussing device focuses the plurality of laser beams such that the spots of the laser beams lie on a straight line parallel to the direction of extension of the interface, before the spots are oscillated. In this case, the spots of all the laser beams have the same oscillating range in the direction perpendicular to the interface. The above-indicated straight line represents the center line of the oscillating range. In this case, the oscillating range can be minimized, leading to improved welding efficiency.

In a further preferred form of the present apparatus, the focussing device focuses a first laser beam and a second laser beam as the plurality of laser beams on the surfaces of the workpieces such that spots of the first and second laser beams are spaced from each other in the direction of extension of the interface, and the apparatus further comprises an energy amount setting device for setting energy amounts of the first and second laser beams at the spots thereof. In this case, the amounts of energy of the first and second laser beams are determined as needed depending upon the specific welding condition, so that the welding accuracy is improved.

In one advantageous arrangement of the above preferred form of the apparatus, the energy amount setting device sets the energy amounts of the first and second laser beams such that the energy amount of the second laser beam is larger than that of the first laser beam, and the focussing device focuses the first and second laser beams such that the first laser beam precedes the second laser beam in a direction of relative movements of the spots of the first and second laser beams and the workpieces in the direction of extension of the interface. In this arrangement, each region of the workpieces along the interface is irradiated first by the first laser beam having the relatively small amount of energy, and then by the second laser beam having the relatively large amount of energy, while the beam spots and the workpieces are moved relative to each other in the direction of the interface. Thus, the first laser beam functions as a preliminary heating beam, while the second laser beam functions as a primary heating beam for heating or fusing the spot pre-heated by the preliminary heating beam, with higher efficiency of absorption of energy in the workpieces upon irradiation by the second laser, whereby a comparatively large weld zone or bead is obtained on the back side of the workpieces remote from the surfaces upon which the laser beams are incident.

In a still further preferred form of the present laser welding process, the oscillating device oscillates the spots of the laser beam in the direction perpendicular to the direction of extension of the interface. Where the speed of the relative movement of the laser beam spots and the workpieces is held constant, the speed of movement of the laser beam spots on the workpieces in the direction of extension of the interface is also held constant, permitting even distribution of heat in the direction of extension of the interface.

In a yet further preferred form of the apparatus, the focussing device includes a beam reflecting and condensing member having a concave reflecting surface for reflecting and at the same time condensing a laser beam generated from the laser source, and further includes a beam reflecting and splitting member having a reflecting surface consisting of a plurality of portions which are inclined relative to each other. The beam reflecting and splitting member reflects the laser beam reflected from the beam reflecting and condensing member and at the same time splits the laser beam into a plurality of sub-beams so that the sub-beams are focussed on the surfaces of the workpieces. In this arrangement permits the two laser beams to be focussed on the workpieces, without using two laser sources, and assures accurate relative position of the spots of the laser beams in the direction of extension of the interface, since the beam positions are determined by the angles of inclination of the two portions of the reflecting surface with respect to the base plane.

In one advantageous form of the above preferred form of the apparatus, the oscillating device includes a device for pivoting the beam reflecting and splitting member about a pivot axis thereof. The pivot axis is parallel to the direction of extension of the interface and parallel to the surfaces of the workpieces. The present oscillating device using the pivoting device is comparatively simple in construction, and permits synchronous oscillation of the spots of the laser beams on the surfaces of the workpieces, so that the workpieces are evenly heated or fused in the direction of extension of the interface.

BRIEF DESCRIPTION OF THE DRAWINGS

The above and optional objects, features, advantages and technical and industrial significance of the present invention will be better understood by reading the following detailed description of a presently preferred embodiment of the invention, when considered in connection with the accompanying drawings, in which:

FIG. 2 is a cross sectional view of a torch head of the laser welding apparatus of FIG. 1, taken in a plane perpendicular to a welding direction;

FIG. 3 is a cross sectional view of the torch head, taken along line 3—3 of FIG. 2;

DETAILED DESCRIPTION OF THE PREFERRED EMBODIMENT

A laser welding apparatus constructed according one embodiment of this invention will be described referring to the accompanying drawings. It is to be understood that the drawings do not accurately represent dimensional relationships of individual elements of the apparatus.

Figure 1:
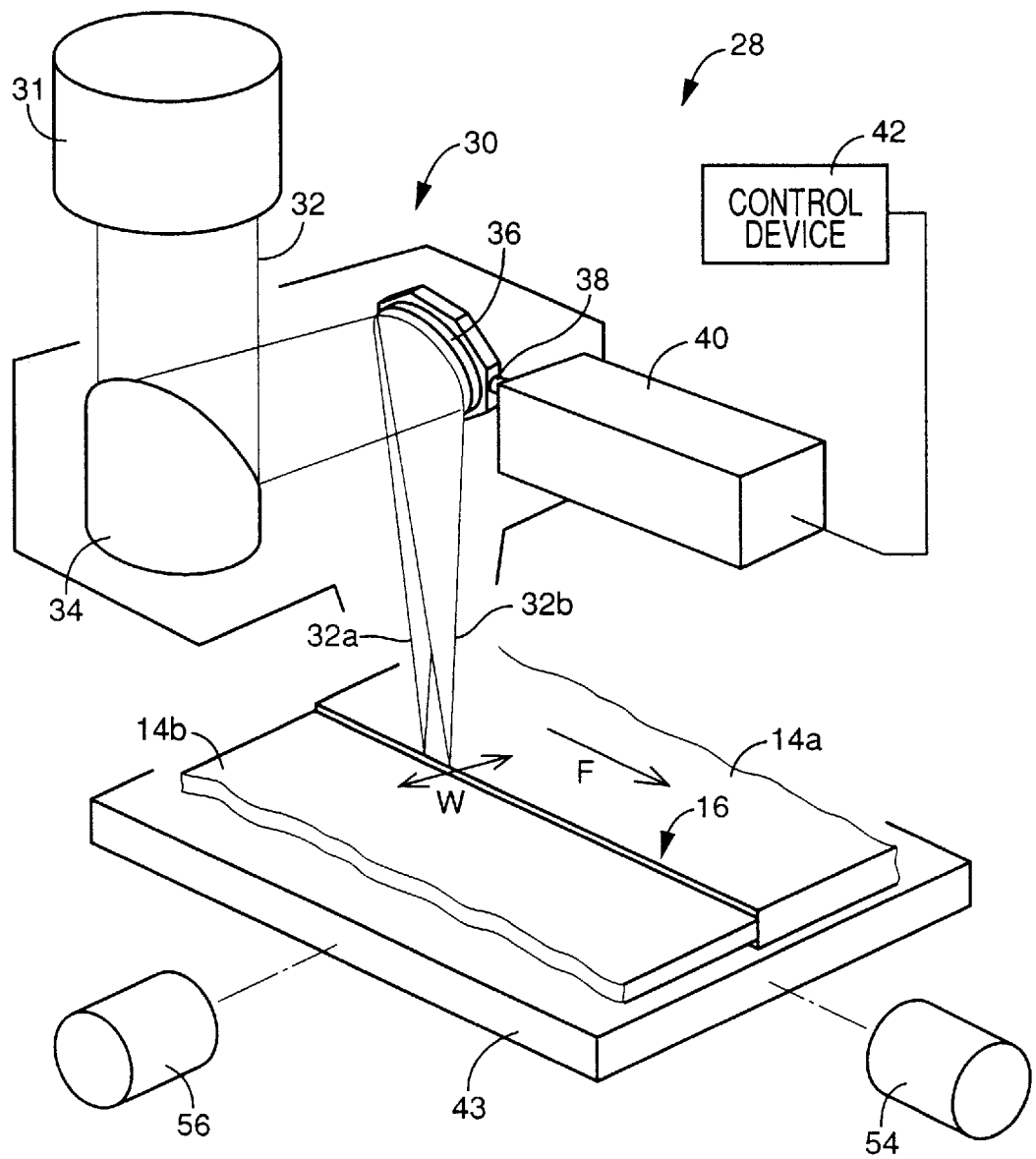
FIG. 1 is a fragmentary perspective view of one embodiment of a laser welding apparatus of the present invention.

Referring first to the fragmentary perspective view of FIG. 1, a laser welding apparatus 28 includes a torch head 30, and a laser source 31 adapted to generate a laser beam 32 such as carbon dioxide gas laser in the form of parallel rays. The torch head 30 has a parabolic mirror 34 for condensing and reflecting the incident laser beam 32, and a twin-spot focussing mirror 36 for splitting the laser beam 32 reflected by the parabolic mirror 34, into two sub-beams 32a, 32b which are focussed on two workpieces in the form of steel plates 14a, 14b which are butted together so as to form an interface 16 corresponding to a weld seam. The spots of the sub-beams 32a, 32b are located in the vicinity of the interface 16 in the direction perpendicular to the direction of extension of the interface 16. The twin-spot focussing mirror 36 is disposed to be pivotable over a predetermined angular range, about an axis 38 thereof which is parallel to the direction of extension of the interface or weld beam 16 and parallel to the surfaces of the steel plates 14a, 14b.

The laser welding apparatus 18 further includes a galvanometer 40 fixed to the torch head 30, a control device 42 for controlling the galvanometer 40, and an X-Y table 43 on which the workpieces 14a, 14b are fixedly mounted and which is moved in X-axis and Y-axis directions. The galvanometer 40 is provided for rotating or pivoting the twin-spot focussing mirror 36 about the pivot axis 38. The control device 42 is adapted to control the operating frequency and amplitude of the galvanometer 40, for thereby controlling the pivoting speed and angle of the twin-spot focussing mirror 36. The X-axis and Y-axis directions are perpendicular to each other and to the direction in which the sub-beams 32a, 32b are incident upon the workpieces 14a, 14b. In the present embodiment, the torch head 30 functions as a focussing device for focussing a plurality of laser beams 32 on the surfaces of the workpieces 14a, 14b.

The parabolic mirror 34 has a concave reflecting surface 44 in the form of a parabolic surface or paraboloid, which is inclined by about 45°, for example, with respect to the direction in which the laser beam 32 from the laser source 31 is incident. As shown in the cross sectional view of FIG. 2 taken in a plane perpendicular to the interface 16, the laser beam 32 vertically incident upon the reflecting surface 44 is condensed while it is reflected by the reflecting surface 44 so as to travel horizontally toward the twin-spot focussing mirror 36. The laser beam 32 incident upon the twin-spot focussing mirror 46 is reflected by this mirror 46 so that the laser beam 32 is focussed on the surfaces of the workpieces 14.

Figure 4:
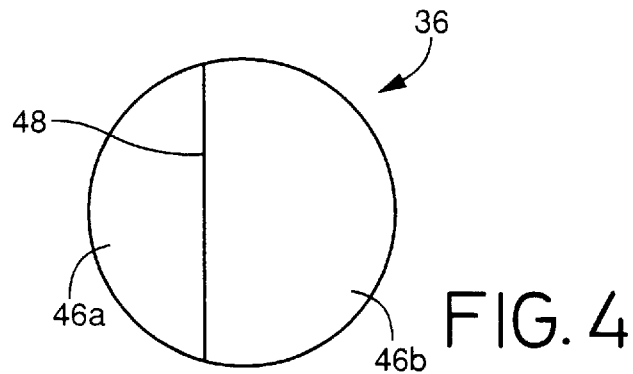
FIG. 4 is a plan view of a twin-spot focussing mirror used in the torch head of FIGS. 2 and 3.
Figure 5:
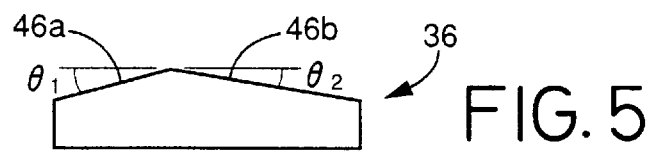
FIG. 5 is a front elevational view of the twin-spot focussing mirror.
Figure 6:
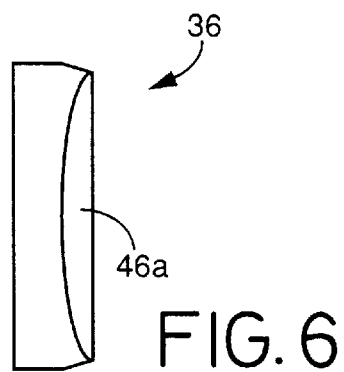
FIG. 6 is a left side elevational view of the twin-spot focussing mirror.
Figure 7:
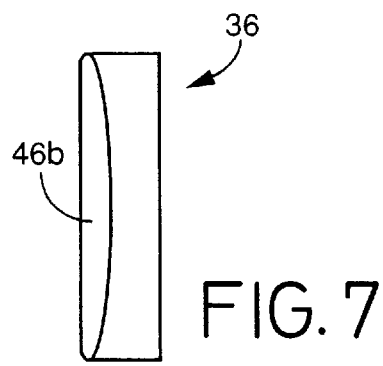
FIG. 7 is a right side elevational view of the twin-spot focussing mirror.

As indicated above, the twin-spot focussing mirror 36 has a function of splitting the laser beam 32 into the first and second sub-beams 32a, 32b, as well as the beam focussing function. To this end, the twin-spot focussing mirror 36 has a reflecting mirror in the form of a generally circular disc having a reflectance of about 98%, as shown in the plan view and the front, left and right side elevational views of FIGS. 4, 5, 6 and 7. This reflecting mirror has a reflecting surface 46 on its front side facing the parabolic mirror 34. The reflecting surface 46 consists of a first portion 46a and a second portion 46b which are inclined by predetermined respective angles θ1 and θ2 with respect to a base plane perpendicular to the axis of the above-indicated circular disc (i.e., plane parallel to the back side surface opposite to the reflecting surface 46), as indicated in FIG. 5. These two portions 46a, 46b of the reelecting mirror 46 are contiguous with each other at a division or boundary line 48 parallel to the above-indicated base plane, as indicated in FIG. 4. In other words, the reflecting surface 46 is bent at the division line 48, which is offset some distance from the above-indicated axis of the circular disc of the mirror 36, so that the first portion 46a has a smaller surface area than the other portion 46b, as also indicated in FIGS. 4 and 5.

With the laser beam 32 being incident upon the reflecting surface 46 of the twin-spot focussing mirror 36 constructed as described above, the laser beam 32 is split into the first and second sub-beams 32a, 32b corresponding to the respective first and second portions 46a, 46b of the reflecting surface 46, with a splitting ratio determined by the position of the division line 48 which is offset from the axis of the mirror 36 as described above. When the twin-spot focussing mirror 36 is placed in a neutral position about its pivot axis 38, the two sub-beams 32a, 32b are focussed at respective two positions which are located in the vicinity of the interface 16 as viewed in the direction perpendicular to the direction of extension of the interface 16. The above two positions are spaced from each other in the direction parallel to the interface 16. Described more specifically, the division line 48 of the twin-spot focussing mirror 36 lies in a plane perpendicular to the pivot axis 38 parallel to the interface 16. Therefore, the spots of the sub-beams 32a, 32b focussed on the workpieces 14a, 14b lie on a straight line which is parallel to the interface 16, as indicated in FIG. 1. In the present embodiment, this straight line is substantially aligned with the interface 16. The spots of the sub-beams 32a, 32b are spaced from each other by a predetermined distance "d" in the direction parallel to the interface 16, as shown in FIG. 3.

With the twin-spot focussing mirror 36 being pivoted in an oscillating fashion by the galvanometer 40 between two angular positions cross the above-indicated neutral position, the spots of the sub-beams 32a, 32b are oscillated by a predetermined oscillating distance "W" in the direction perpendicular to the interface 16, with the distance "d" being maintained, as shown in FIG. 1. In the present embodiment, the twin-spot focussing mirror 36 having the pivot axis 38 and the galvanometer 40 cooperate to constitute an oscillating device for oscillating the spots of the sub-beams 32a, 32b at a predetermined frequency relative to the workpieces 14a, 14b in a direction intersecting the interface 16 so that the beam spots are moved across the interface 16 in the opposite directions. The amounts of energy of the two sub-beams 32a, 32b are determined by the surface area ratio of the portions 46a, 46 of the reflecting surface 46 of the twin-spot focussing mirror 36. In this embodiment, the energy amount of the first sub-beam 32a is smaller than that of the second sub-beam 32b. It will be understood that the twin-spot focussing mirror 36 functions as a device for setting the amounts of energy of the first and second sub-beams 32a, 32b.

An X-axis drive device 54 is provided for feeding the X-Y table 43 and the workpieces 14a, 14b mounted thereon, in the X-axis direction parallel to the interface 16, while a Y-axis drive device 56 is provided for feeding the X-Y table 43 and the workpieces 14a, 14b in the Y-axis direction perpendicular to the X-axis direction. The X-axis and Y-axis drive devices 54, 56 are controlled by either the control device 42 or another control device, so that the spots of the sub-beams 32a, 32b are moved relative to the workpieces 14a, 14b, along the interface 16. It will be understood that the X-Y table 43 and the X-axis and Y-axis drive devices 54, 56 constitute a feeding device for moving the spots of the sub-beams 32a, 32b relative to the workpieces 14a, 14b in the direction parallel to the interface 16. A suitable Z-axis drive device (not shown) is provided for moving the torch head 30 in a Z-axis direction perpendicular to the X-axis and Y-axis directions, for adjusting the height of the torch head 30 so as to focus the sub-beams 32a, 32b on the surfaces of the workpieces 14a, 14b. This Z-axis drive device may be adapted to move the X-Y table 43, rather than the torch head 30, in the Z-axis direction.

The two workpieces in the form of the steel plates 14a, 14b to be welded together by the present laser welding apparatus 28 are fixedly mounted on the X-Y table 43 such form the interface 16 which corresponds to the weld seam to be formed by welding. The X-Y table 43 and the steel plates 14a, 14b are fed in a welding or feeding direction "F" parallel to the interface 16, as indicated in FIG. 1, while the sub-beams 32a, 32b are focussed on the surfaces of the steel places 14a, 14b, and adjacent to the interface 16 as viewed in the direction perpendicular to the direction of extension of the interface 16, so that the materials of the steel plates 14a, 14b are fused and welded together along the interface 16.

Figure 8:
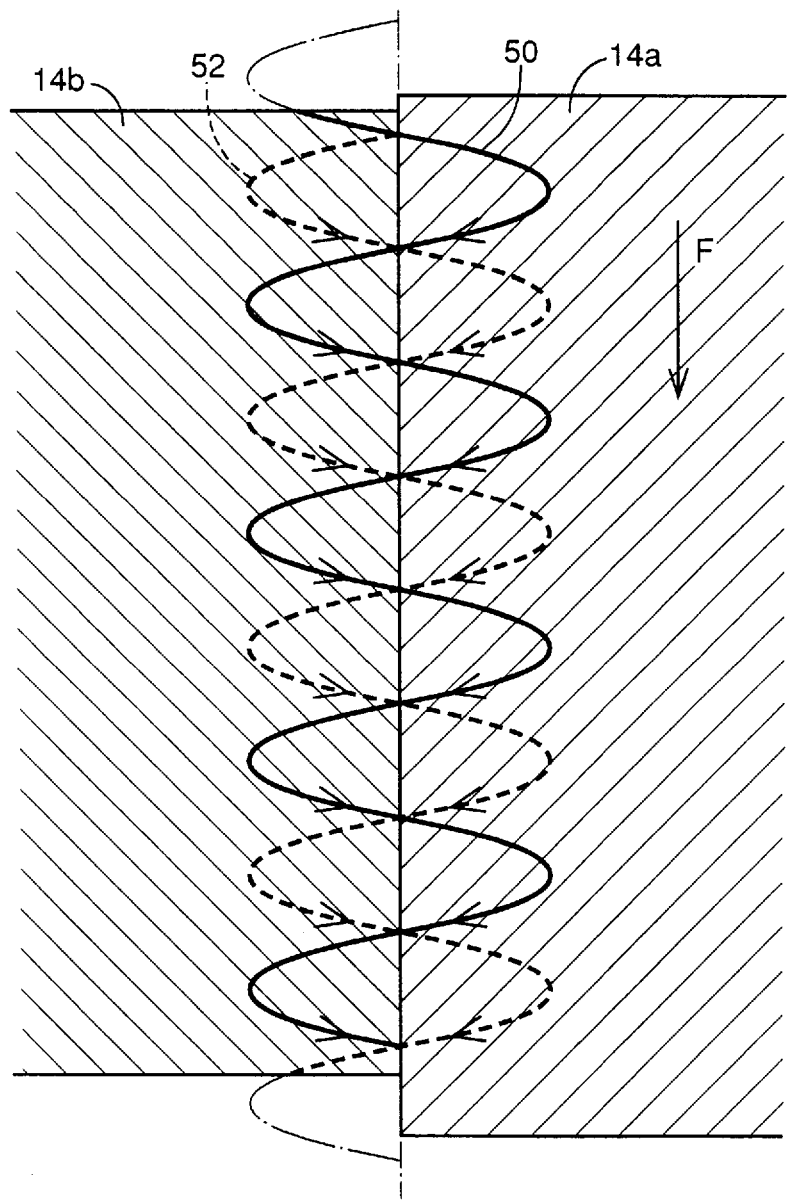
FIG. 8 is a view indicating a movement path of first and second laser beam spots in the laser welding apparatus of FIG. 1.
Figure 9:
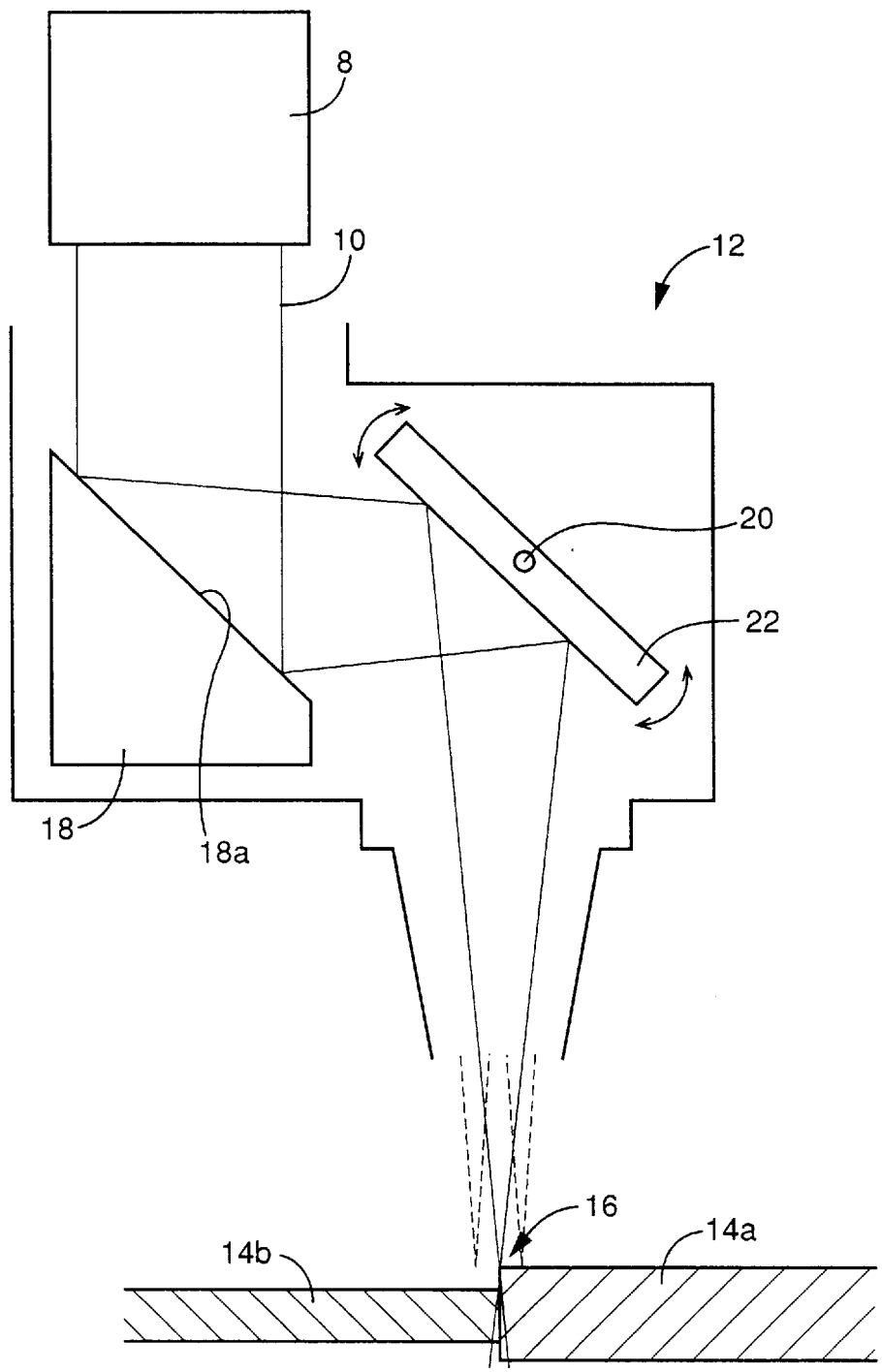
FIG. 9 is a view showing a torch head of a known laser welding apparatus.
Figure 10:
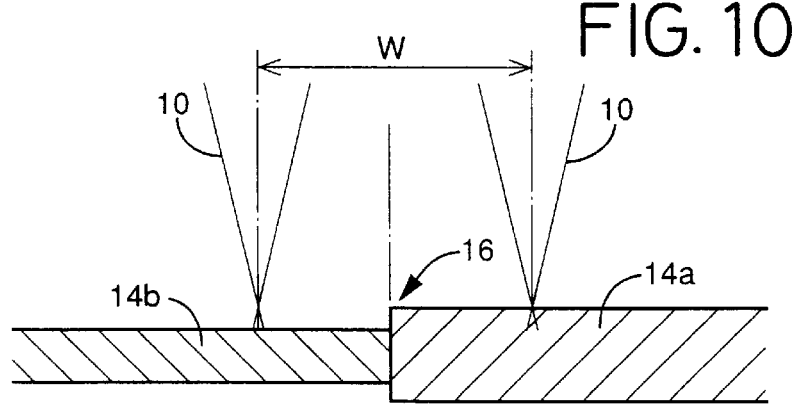
FIG. 10 is a view indicating an oscillating distance of a laser beam focussed by the torch head of FIG. 1.

While the spots of the sub-beams 32a, 32b are moved relative to the workpieces 14a, 14b by the X-Y table 43 in the feeding direction F, the twin-spot focussing mirror 36 is oscillatingly pivoted in the opposite directions by the galvanometer 40, which is operated according to the oscillating frequency and amplitude as specified by the control device 42. As a result, the spots of the sub-beams 32a, 32b take respective sinusoidal movement paths 50, 52 on the workpieces 14a, 14b, as indicated in FIG. 8 by solid and broken lines, respectively. The sinusoidal or sine waves of these two movement paths 50, 52 have the same wavelength and amplitude. In the present embodiment, the spot of the first sub-beam 32a precedes the spot of the second sub-beam 32b so that the spot of the first sub-beam 32a irradiates a given portion of the workpieces 14 before the spot of the second sub-beam 32b irradiates that portion while the spots and the workpieces 14 are moved relative to each other in the direction parallel to the interface 16. Further, the distance "d" between the spots of the two sub-beams 32a, 32b on the workpieces 14, the feeding speed of the workpieces 14 (X-Y table 43) and the pivoting speed of the twin-spot focussing mirror 36 (i.e., operating frequency of the galvanometer 40) are determined so that the distance "d" is equal to a half of the wavelength of the sinusoidal waves of the movement paths 50, 52 of the spots. In this arrangement, the sinusoidal movement paths 50, 52 have a phase difference equal to the half wavelength and intersect each other on the straight line aligned with the interface 16. Namely, the two sinusoidal movement paths 50, 52 taken by the spots of the two sub-beams 32a, 32b on the surfaces of the workpieces 14 intersect each other in synchronization with the oscillating movements of the spots.

Figure 11:
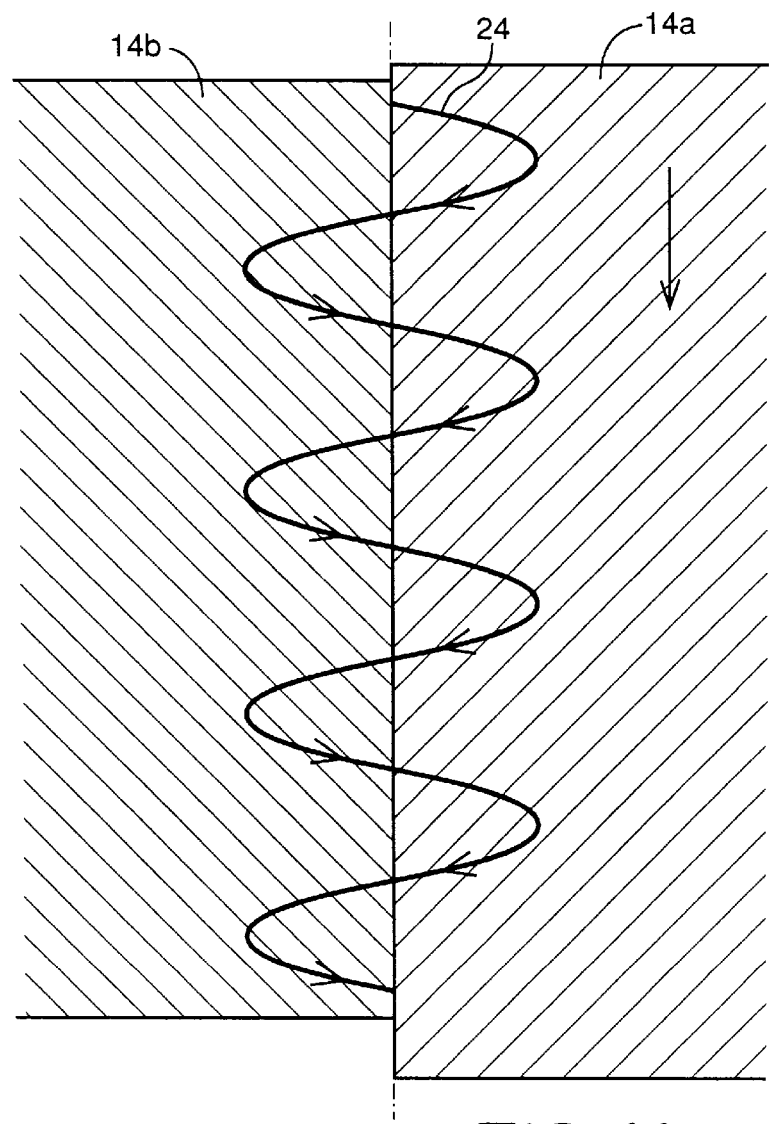
FIG. 11 is a view indicating a movement path of the laser beam in the known laser welding apparatus.
Figure 12:
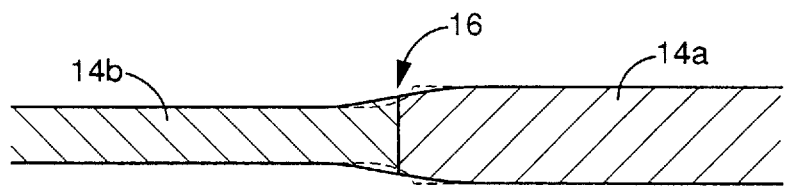
FIG. 12 is a view indicating a condition of welding of the workpieces when the workpieces are laser-welded as indicated in FIGS. 10 and 11.

Since the first and second portions 46a, 46b of the reflecting surface 46 of the twin-spot focussing mirror 36 have the different surface areas as described above, the first sub-beam 32a whose spot precedes the spot of the second sub-beam 32b has a smaller amount of energy corresponding to the smaller surface area of the portion 46a, than the second sub-beam 32b whose amount of energy corresponds to the larger surface area of the portion 46b. Consequently, the workpieces 14 are irradiated along the interface or weld seam 16 first by the first sub-beam 32a, and then by the second sub-beam 32b having the larger amount of energy, so that the materials in the irradiated portion of the workpieces 14 are sufficiently heated or fused with the laser beam energy being absorbed by the materials with relatively high efficiency. Since the workpieces 14 are irradiated along the interface 16 by the two oscillating sub-beams 32a, 32b, the distance between the adjacent peaks of the sinusoidal waves of the movement paths 50, 52 in the direction parallel to the interface 16 is made considerably smaller than the distance between the adjacent peaks of the sinusoidal wave of the movement path of a single oscillating beam used in the prior art as indicated in FIG. 11. The present arrangement results in improved uniformity of the welding temperature or even distribution of the heat in the direction of extension of the interface 16. Thus, this arrangement makes it possible to sufficiently and evenly fuse the workpieces 14 along the interface 16, even if the amount of energy incident upon the workpieces 14 is relatively small. Accordingly, the present welding apparatus 28 makes it possible to increase the feeding speed and therefore the welding speed of the workpieces 14, as compared with the known welding apparatus using a single oscillating laser beam.

As described above, the present welding apparatus 28 includes: the focussing device in the form of the torch head 30 for focussing the two sub-beams 32a, 32b on the surfaces of the workpieces in the form of the steel plates 14a, 14b; the oscillating device in the form of the twin-spot focussing mirror 36 pivotable about the pivot axis 38 and the galvanometer 40, for oscillating the spots of the sub-beams 32a, 32b at a predetermined frequency relative to the workpieces 14a, 14b, in the direction intersecting the interface 16 so that the spots are moved across the interface 16 in the opposite directions; and the feeding device in the form of the X-Y table 43 and the X-axis and Y-axis drive devices 54, 56, for moving the spots of the sub-beams 32a, 32b relative to the workpieces 14a, 14b, in the direction of extension of the interface 16. When the workpieces 14a, 14b are welded together, the sub-beams 32a, 32b are focussed on the surfaces of the workpieces 14 such that the beam spots are located in the vicinity of the interface 16. The spots of the sub-beams 32a, 32b are moved relative to the workpieces 14 along the interface 16 while at the same time are oscillated in the direction perpendicular to the interface 16 such that the spots are moved across the interface 16, whereby the beam spots take the respective sinusoidal movement paths 50, 52 on the workpieces. Consequently, the present welding apparatus 28 makes it possible to increase the speed of the relative movements of the spots of the sub-beams 32a, 32 and the workpieces 14a, 14b, that is, the welding speed, without increasing the oscillating frequency of the beam spots, even when the total energy of the two sub-beams 32a, 32b is the same as the energy of a single beam in the known apparatus.

In the present embodiment, the welding apparatus 28 further includes the control device 42 for controlling the speed of oscillation of the spots of the two sub-beams 32a, 32b on the surfaces of the workpieces 14a, 14b so that the sinusoidal movement paths 50, 52 taken by the two sub-beams 32a, 32b intersect each other in synchronization with the frequency of oscillation of the spots of the sub-beams 32a, 32b. Thus, the spots of the two sub-beams 32a, 32b are simultaneously oscillated across the interface 16 and moved along the interface 16, relative to the workpieces 14, so that the spots take the respective two intersecting sinusoidal movement paths 50, 52. Namely, the two sinusoidal movement paths 50, 52 are not coincident or aligned with each other, but intersect each other as indicated in FIG. 8, whereby the distance between the adjacent peaks of the two sinusoidal movement paths 50, 52 in the direction parallel to the interface 16 is reduced with a result of increased uniformity of heating or fusion in the direction of extension of the interface 16. In the present embodiment, the points of intersection of the sinusoidal movement paths 50, 52 lie on the interface 16. The total amount of energy given by the two sub-beams 32a, 32b at these points of intersection is larger than the amount of energy given at the other points, thereby making it possible to compensate for a comparatively small amount of energy given by each sub-beam 32a, 32b at the interface 16 at which the distance between the adjacent spots of the sub-beam in the direction of the interface 16 is the largest.

In the present embodiment, the torch head 30 functioning as the focussing device is adapted such that the first sub-beam 32a precedes the second sub-beam 32b in the direction in which the beam spots are moved relative to the workpieces 14 in the direction parallel to the interface 16. Further, the twin-spot focussing mirror 36 functioning as the energy amount setting device is adapted such that the second sub-beam 32b has a larger amount of energy than the first sub-beam 32a, so that each spot along the interface 16 is irradiated first by the first sub-beam 32a having the relatively small amount of energy, and then by the second sub-beam 32b having the relatively large amount of energy, while the beam spots and the workpieces 14 are moved relative to each other in the direction of the interface 16. In the present arrangement, the first sub-beam 32a functions as a preliminary heating beam, while the second sub-beam 32b functions as a primary heating beam for heating or fusing the spot pre-heated by the preliminary heating beam, with higher efficiency of absorption of energy in the workpieces 14 upon irradiation by the second sub-beam 32b, whereby a comparatively large weld zone or bead is obtained on the back side of the workpieces 14 remote from the torch head 30.

The spots of the two sub-beams 32a, 32b are oscillated in the direction perpendicular to the interface 16, by the oscillating device which includes the twin-spot focussing mirror 36 pivotable about the pivot axis 38 and the galvanometer 40. Where the speed of the relative movement of the beam spots and the workpieces 14 is held constant, the speed of movement of the beam spots on the workpieces 14a, 14b in the direction of the interface 16 is also held constant, permitting even distribution of heat in the direction of the interface 16.

It is also noted that the torch head 30 which functions as the focusing device as described above includes the parabolic mirror 34 having the concave reflecting surface 44, and the twin-spot focussing mirror 36 having the reflecting surface 46 consisting of the first and second portions 46a, 46b which have respective angles of inclination with respect to the base plane. The parabolic mirror 34 function as a beam reflecting and condensing member adapted to reflect and at the same time condense the parallel rays of the laser beam 32 generated from the laser source 31. The twin-spot focussing mirror 36 functions as a beam reflecting and splitting member adapted to reflect the incident laser beam 32 and at the same time split the laser beam 32 into the first and second sub-beams 32a, 32b so that the sub-beams 32a, 32b are focussed on the surfaces of the two workpieces 14a, 14b and near the interface 16. This arrangement permits the two sub-beams 32a, 32b to be focussed on the workpieces 14a, 14b, without using two laser sources, and assures accurate relative position of the spots of the two sub-beams 32a, 32b in the direction of the interface 16, since the beam positions are determined by the angles of inclination of the two portions 46a, 46b of the reflecting surface 46 with respect to the base plane.

In the present embodiment, the oscillating device using the twin-spot focussing mirror 36 pivotable about the pivot axis 38 is relatively simple in construction, and permits synchronous oscillation of the spots of the two sub-beams 32a, 32b on the surfaces of the workpieces 14, so that the workpieces 14 are evenly heated or fused along the interface 16.

While the presently preferred embodiment of the present invention has been described above by reference to the accompanying drawings, it is to be understood that the invention may be otherwise embodied.

The illustrated embodiment wherein the reflecting surface 46 consists of the two portions 46a, 46b may be modified such that the reflecting surface 46 consists of three or more portions for splitting the incident laser beam 32 into three or more sub-beams, which permit improved uniformity of heating or fusion of the workpieces.

While the portions 46a, 46b of the reflecting surface 46 have straight surfaces, these portions 46a, 46b may have concave surfaces.

Although the portions 46a, 46b have different surface areas, they may have the same surface area.

The twin-spot focussing mirror 36 in the illustrated embodiment is adapted such the spots of the two sub-beams 32a, 32b lie on a straight line aligned with the interface 16 and are spaced from each other in the direction of extension of the interface 16. However, the mirror 36 may be adapted such that the spots of the two sub-beam 32a, 32b lie on a straight line which intersects the interface 16 at a given angle. The spots of the two sub-beams 32a, 32b may lie on a straight line perpendicular to the interface 16. In this case in which the two spots are not spaced from each other in the direction of extension of the interface 16, the spots are oscillated in a direction intersecting the interface at an angle other than 90°.

In the illustrated embodiment, the pivot axis 38 is parallel to the interface 16 so that the spots of the sub-beams 32a, 32b are oscillated in the direction perpendicular to the interface 16. However, the oscillating direction of the beam spots need not be perpendicular to the interface 16 and may be inclined with respect to the interface 16, unless the oscillating direction is parallel to the interface 16.

While the pivoting speed of the twin-spot focussing mirror 36 and the other parameters are determined so that the sinusoidal movement paths 50, 52 of the spots of the two sub-beams 32a, 32 intersect each other on the interface 16 as shown in FIG. 8, these movement paths 50, 52 need not intersect each other on the interface 16, or need not intersect each other. For instance, the two movement paths 50, 52 may be coincident or aligned with each other.

The welding apparatus 38 according to the illustrated embodiment uses the twin-spot focussing mirror 36 for splitting the laser beam 32 generated by the laser source 31, into the plurality of sub-beams 32a, 32b, and focussing the sub-beams 32a, 32b on the workpieces 14. However, a half mirror may be used for splitting the laser beam 32. Alternatively, two laser sources 31 may be used to generate two laser beams which are focussed by suitable means.

It is to be understood that the present invention may be embodied with various other changes and modifications, without departing from the spirit of the invention.

What is claimed is:

1. A process of welding workpieces butted together at an interface, comprising the steps of:

focusing a plurality of laser beams on surfaces of said workpieces such that spots of said laser beams are located in the vicinity of said interface as viewed in a direction perpendicular to a direction of extension of said interface, said plurality of laser beams including two laser beams, producing spots that are spaced from each other in said direction of extension of said interface; and feeding said spots of said laser beams and said workpieces relative to each other in said direction of extension of said interface, while at the same time oscillating said spots of said laser beams at a predetermined frequency relative to said workpieces in a direction intersecting said direction of extension of said interface such that said spots are moved across said interface, such that respective movements of the spots of said two laser beams transcribe sinusoidal waves on the surfaces of the workpieces and the distance between the spots in said direction of extension of said interface is substantially equal to one half of the wavelength of each sinusoidal wave.

2. A process according to claim 1, wherein said spots and said workpieces are fed relative to each other while said spots are oscillated such that movement paths taken by said spots of said plurality of laser beams on the surfaces of the workpieces intersect each other in synchronization of a frequency of oscillation of said spots in said direction intersecting said direction of extension of said interface.

3. A process according to claim 1, wherein said two laser beams are focussed such that said spots of said two laser beams lie on a straight line parallel to said direction of extension of said interface, before said spots are oscillated.

4. A process according to claim 1, wherein said two laser beams consist of a first beam and a second beam focused on two respective spots on said workpieces and which have different amounts of energy.

5. A process according to claim 4, wherein said second laser beam has a larger amount of energy than said first laser beam, and said first laser beam precedes said second laser beam in a direction of relative movement of said spots of the first and second laser beams and said workpieces in said direction of extension of said interface.

6. A process according to claim 1, wherein said spots of said plurality of laser beams and said workpieces are fed relative to each other in said direction of extension of said interface while at the same time said spots are oscillated in a direction perpendicular to said direction of extension of said interface.

7. A process according to claim 1, wherein said plurality of laser beams consist of two laser beams forming spots on a straight line aligned with said interface, and said spots of said two laser beams and said workpieces are fed relative to each other while the spots of said two laser beams are oscillated such that the paths transcribed by said spots of said two laser beams intersect each other on said straight line.

8. An apparatus for welding together workpieces butted together at an interface, comprising:

a focusing device for focusing a plurality of laser beams on surfaces of said workpieces such that spots of two laser beams of said plurality of laser beams are spaced by a distance from each other in a direction of extension of said interface;

an oscillating device for oscillating said spots of said laser beams at a predetermined frequency relative to said workpieces in a direction intersecting said direction of extension of said interface such that said spots are moved across said interface;

a feeding device for feeding said spots of said laser beams and said workpieces relative to each other in said direction of extension of said interface; and a control device for controlling said oscillating device and said feeding device such that respective movements of the spots of said two laser beams transcribe sinusoidal waves on the surfaces of the workpieces and the distance between the spots in said direction of extension of said interface is substantially equal to one half of the wavelength of each sinusoidal wave.

9. An apparatus according to claim 8, wherein said control device controls said oscillating device and said feeding device such that the paths taken by said spots of said plurality of laser beams on the surfaces of said workpieces intersect each other in synchronization with the predetermined frequency of oscillation of said spots in said direction intersecting said direction of extension of said interface.

10. An apparatus according to claim 8, wherein said focusing device focuses said two laser beams such that said spots of said two laser beams lie on a straight line parallel to said direction of extension of said interface, before said spots are oscillated.

11. An apparatus according to claim 8, wherein said focussing device focuses a first laser beam and a second laser beam as said two laser beams on the surfaces of said workpieces such that spots of said first and second laser beams are spaced from each other in said direction of extension of said interface, said apparatus further comprising an energy amount setting device for setting energy amounts of said first and second laser beams at the spots thereof.

12. An apparatus according to claim 11, wherein said energy amount setting device sets said energy amounts of said first and second laser beams such that the energy amount of said second laser beam is larger than that of said first laser beam, and wherein said focussing device focuses said first and second laser beams such that said first laser beam precedes said second laser beam in a direction of relative movement of said spots of said first and second laser beams and said workpieces in said direction of extension of said interface.

13. An apparatus according to claim 8, wherein said oscillating device oscillates said spots of said plurality of laser beam in said direction perpendicular to said direction of extension of said interface.

14. An apparatus according to claim 8, further comprising a laser source for generating a laser beam, and wherein said focussing device includes a beam reflecting and condensing member having a concave reflecting surface for reflecting and at the same time condensing said laser beam generated from said laser source, and further includes a beam reflecting and splitting member having a reflecting surface consisting of a plurality of portions which are inclined relative to each other, said beam reflecting and splitting member reflecting said laser beam reflected from said beam reflecting and condensing member and at the same time splitting said laser beam into a plurality of sub-beams so that said sub-beams are focussed on the surfaces of said workpieces.

15. An apparatus according to claim 14, wherein said oscillating device includes a device for pivoting said beam reflecting and splitting member about a pivot axis thereof.

16. An apparatus according to claim 15, wherein said pivot axis is parallel to said direction of extension of said interface and parallel to the surfaces of said workpieces.

17. An apparatus according to claim 8, wherein said plurality of laser beams consist of two laser beams, and said focusing device focuses said two laser beams such that the spots of the two laser beams lie on a straight line aligned with said interface, said control device controlling said oscillating device and said feeding device such that the paths transcribed by said spots of said two laser beams intersect each other on said straight line.

18. An apparatus for welding together workpieces butted together at an interface, comprising:

a laser source for generating a laser beam;

a focusing device including a beam reflecting and condensing member for reflecting and at the same time condensing said laser beam generated from said laser source, and an integral beam reflecting and splitting member having a reflecting surface comprising of a plurality of portions which are inclined with respect to each other, said beam reflecting and splitting member reflecting said laser beam reflected from said beam reflecting and condensing member and at the same time, splitting said laser beam into a plurality of sub-beams such that said sub-beams are focused on surfaces of said workpieces and such that spots of said plurality of sub-beams are spaced from each other in a direction of extension of said interface;

an oscillating device for oscillating said spots of said plurality of sub-beams in a direction intersecting said direction of extension of said interface such that said spots are moved across said interface;

a feeding device for feeding said spots of said sub-beams and said workpieces relative to each other in said direction of extension of said interface; and a control device for controlling said oscillating device and said feeding device such that respective movements of the spots of said sub-beams transcribe sinusoidal waves on the surfaces of the workpieces and the distance between the spots in said direction of extension of said interface is substantially equal to one half of the wavelength of each sinusoidal wave.

19. An apparatus according to claim 18, wherein said integral beam reflecting and splitting member splits said laser beam into said two sub-beams such that said spots of said two laser beams lie on a straight line aligned with said interface, said control device controlling said oscillating device and said feeding device such that said movement paths of said spots of said two sub-beams intersect each other on said straight line.

* * * * *